United States Patent
Ranta-aho et al.

(10) Patent No.: US 10,805,917 B2
(45) Date of Patent: Oct. 13, 2020

(54) DETERMINATION OF RESOURCE BLOCK GROUPS IN A USER EQUIPMENT BANDWIDTH PART

(71) Applicant: Nokia Technologies Oy, Espoo (FI)

(72) Inventors: Karri Ranta-aho, Espoo (FI); Karol Schober, Helsinki (FI); Youngsoo Yuk, Seoul (KR)

(73) Assignee: NOKIA TECHNOLOGIES OY, Espoo (FI)

(*) Notice: Subject to any disclaimer, the term of this patent is extended or adjusted under 35 U.S.C. 154(b) by 25 days.

(21) Appl. No.: 16/191,935

(22) Filed: Nov. 15, 2018

(65) Prior Publication Data

US 2019/0159182 A1 May 23, 2019

Related U.S. Application Data

(60) Provisional application No. 62/589,868, filed on Nov. 22, 2017.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0037* (2013.01); *H04L 5/0039* (2013.01);
(Continued)

(58) Field of Classification Search
CPC ........... H04W 72/042; H04W 72/0453; H04W 16/12; H04W 72/1289; H04L 5/0039;
(Continued)

(56) References Cited

U.S. PATENT DOCUMENTS

2017/0325237 A1* 11/2017 Sun ................ H04W 72/04
2019/0159226 A1* 5/2019 Ly ................. H04L 5/0053
(Continued)

OTHER PUBLICATIONS

"3rd Generation Partnership Project; Technical Specification Group Radio Access Network; NR; Physical channels and modulation (Release 15)", 3GPP TS 38.211, V1.0.0, Sep. 2017, pp. 1-37.
(Continued)

*Primary Examiner* — Jay P Patel
(74) *Attorney, Agent, or Firm* — Squire Patton Boggs (US) LLP

(57) ABSTRACT

Various communication systems may benefit from an improved resource block group allocation in a cell. A method may include determining at a network entity a common frequency resource allocation grid in a cell. The method may also include configuring at the network entity a frequency location of a bandwidth part of a user equipment within the cell. The frequency location of the bandwidth part may be offset from a reference point of the common frequency resource allocation grid. In addition, the method may include determining a size of one or more of a plurality of resource block groups within the bandwidth part of the user equipment based on the frequency location of the bandwidth part and the reference point. Further, the method may include transmit downlink control information from the network entity to the user equipment.

20 Claims, 4 Drawing Sheets

(51) Int. Cl.
*H04W 16/12* (2009.01)
*H04W 72/12* (2009.01)

(52) U.S. Cl.
CPC .......... *H04L 5/0053* (2013.01); *H04L 5/0094* (2013.01); *H04W 16/12* (2013.01); *H04W 72/0453* (2013.01); *H04L 5/0007* (2013.01); *H04W 72/1289* (2013.01)

(58) Field of Classification Search
CPC ... H04L 5/0037; H04L 5/0094; H04L 5/0053; H04L 5/0007
See application file for complete search history.

(56) References Cited

U.S. PATENT DOCUMENTS

| | | | | |
|---|---|---|---|---|
| 2019/0222281 | A1* | 7/2019 | Sirotkin | H04B 7/0626 |
| 2019/0280843 | A1* | 9/2019 | Jeon | H04L 5/0053 |
| 2019/0289668 | A1* | 9/2019 | He | H04W 80/08 |

OTHER PUBLICATIONS

"3rd Generation Partnership Project; Technical Specification Group Radio Access Network; NR; Physical layer rocedures for data (Release 15)", 3GPP TS 38.214, V1.1.1, Oct. 2017, pp. 1-55.

Extended European Search Report received for corresponding European Patent Application No. 18204530.2, dated Mar. 25, 2019, 6 pages.

"Resource Allocation and TBS", 3GPP TSG RAN WG1 Meeting #91, R1-1719381, Agenda: 7.3.3.1, Huawei, Nov. 27-Dec. 1, 2017, 16 pages.

"Draft Report of 3GPP TSG RAN WG1 #90bis v0.1.0", 3GPP TSG RAN WG1 Meeting #91, R1-171xxxx, MCC Support, Nov. 27-Dec. 1, 2017, pp. 1-174.

"Wider Bandwidth Operations", 3GPP TSG RAN WG1 NR Meeting# 90, R1-1713654, Agenda: 6.1.3.5, Samsung, Aug. 21-26, 2017, 9 pages.

"Remaining Issues on Bandwidth Part", 3GPP TSG RAN WG1 Meeting #91, R1-1719380, Agenda: R1-1719380, Huawei, Nov. 27-Dec. 1, 2017, 10 pages.

* cited by examiner

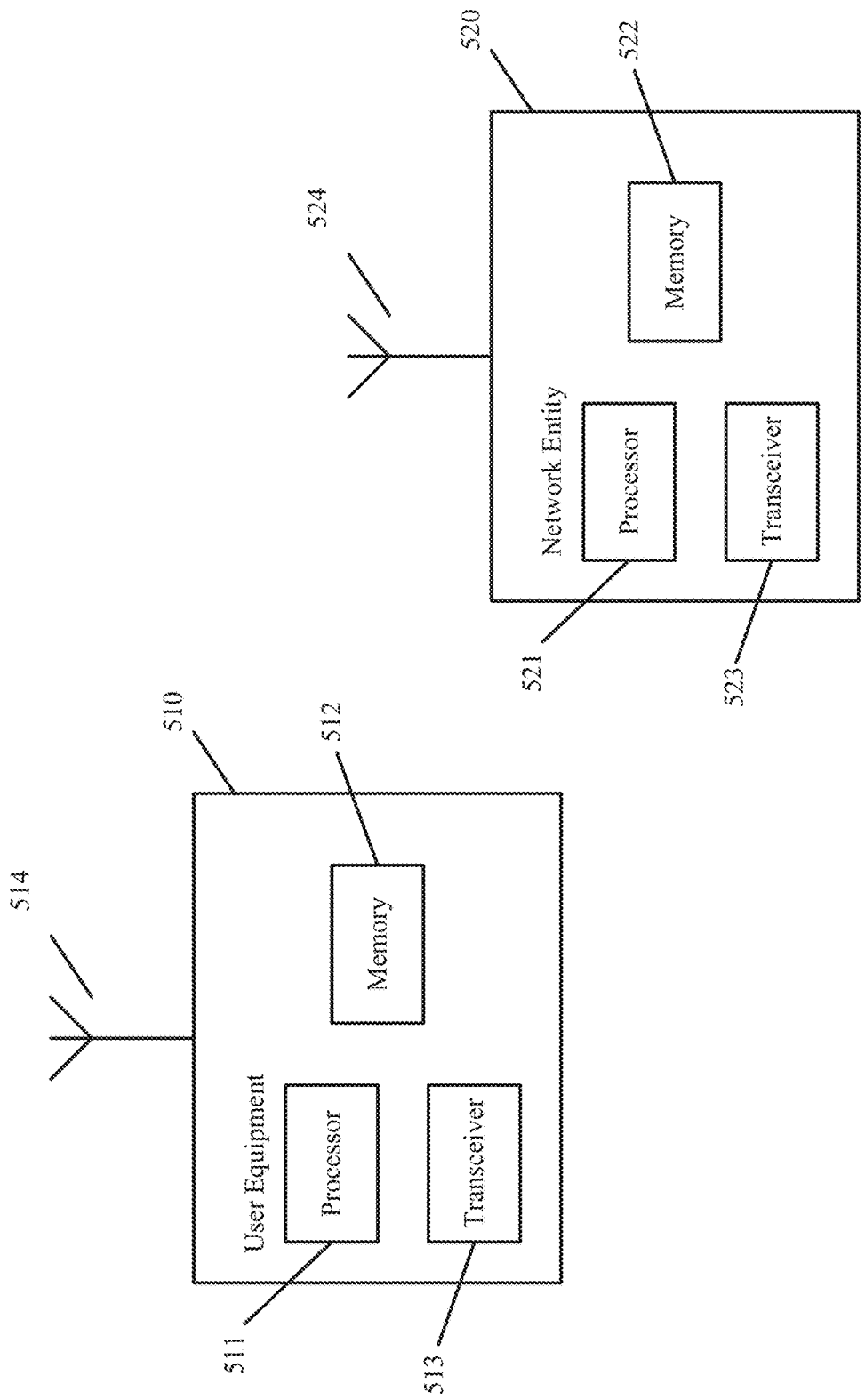

DETERMINATION OF RESOURCE BLOCK GROUPS IN A USER EQUIPMENT BANDWIDTH PART

CROSS-REFERENCE TO RELATED APPLICATIONS

This application claims priority from U.S. provisional patent application No. 62/589,868 filed on Nov. 22, 2017. The contents of this earlier filed application are hereby incorporated in their entirety.

BACKGROUND

Field

Various communication systems may benefit from an improved resource block group allocation in a cell. For example, resource block group allocation may be improved by utilizing a common frequency resource allocation grid in a cell.

Description of the Related Art

Third generation partnership project (3GPP) technology, such as fifth generation (5G) technology or new radio (NR) technology, allocates resources in the frequency domain using a resource block group (RBG). A RBG may be a set of consecutive physical resource blocks (PRBs), with each physical resource block including 12 subcarriers. Generally, the size of the RBG is configured to a user equipment (UE) by the network. In one example, the size of the RBG may be 2, 4, 8, or 16 physical resource blocks.

The network entity configures resource allocation to the user equipment using downlink control information (DCI). DCI, for example, may indicate uplink resource allocation to the user equipment. A DCI format scheduling a physical uplink shared data channel (PUSCH) or a physical downlink shared channel (PDSCH), may contain a DCI field providing frequency domain resource allocation using type 0 downlink resource allocation. The resource block assignment information of a type 0 downlink resource allocation includes a bitmap indicating the RBGs that are allocated to a given user equipment. The number of physical resource blocks included in a given RBG is defined as a higher layer parameter.

The user equipment is also configured with carrier bandwidth parts (BWPs). Each of the BWPs is mapped to one or more physical resource blocks, which can be continuous, and are used by the user equipment (UE) to receive and/or transmit data channels and or other channels and can be configured with respect to a reference point with a start-length resource allocation. Different UEs can have BWPs residing in different parts of a cell's carrier frequency or bandwidth. For example, while the BWP of one UE may cover the entire available bandwidth of a cell, the BWP of another UE may only cover only a portion of the available bandwidth of the cell.

A UE receiving the PUSCH and PDSCH can receive demodulation reference-symbols (DMRS) to coherently detect the transmitted data. To improve the channel estimation, a network entity, such as a 5G or NR NodeB (gNB), typically employs a fixed precoder over multiple PRBs to enable interpolation between DMRS in neighboring PRBs. The group of PRBs over which UE assumes the precoder to be constant is called precoding resource block group (PRG). A size of a RBG can be different than a size of the PRG.

SUMMARY

According to a first embodiment, a method may include determining at a network entity a common frequency resource allocation grid in a cell. The method may also include configuring at the network entity a frequency location of a bandwidth part of a user equipment within the cell. The frequency location of the bandwidth part may be offset from a reference point of the common frequency resource allocation grid. In addition, the method may include determining a size of one or more of a plurality of resource block groups within the bandwidth part of the user equipment based on the frequency location of the bandwidth part relative to the reference point of the common frequency resource allocation grid. Further, the method may include transmitting downlink control information from the network entity to the user equipment. The downlink control information may include a frequency allocation that accommodates the size of the one or more of the plurality of resource block groups.

In a variant, the frequency location of the bandwidth part of the user equipment is offset by a specific number of resource blocks from the reference point of the common frequency resource allocation grid.

In a further variant, the method may include transmitting the downlink control information via a shared channel to the user equipment and another user equipment in the cell.

In another variant, the method may include coordinating uplink transmissions of the user equipment on the one or more of the plurality of resource block groups in the cell, and the uplink transmissions of another user equipment on the one or more of the plurality of resource block groups in the cell based on the determined size or frequency location of the one or more of the plurality of the resource block groups.

In another variant, the resource block groups are precoding resource block groups.

In a further variant, the size of the one or more of the plurality of resource block groups within the bandwidth part is either a configured size or a default size.

In a variant, the method may include calculating the size of a left-most resource block group in the bandwidth part included in the resource block groups. The size of the left-most resource block group may be equal to or lower than the configured size or the default size of the one or more of the plurality of resource block groups.

In another variant, the method may include calculating a number of one of more middle resource block groups included in the plurality of resource block groups in the bandwidth part based on the configured size or the default size of the one or more of the plurality of resource block groups.

In an additional variant, the method may include calculating the size of a right-most resource block group in the bandwidth part included in the resource block groups. The size of the right-most resource block group may be equal to or lower than the configured size or the default size of the one or more of the plurality of resource block groups.

In a variant, a length of a frequency resource allocation field of the downlink control information is calculated to accommodate or to be a same size for at least one of the left-most resource block group, the one or more middle resource block groups, or the right-most resource block group.

In a further variant, the right-most group resource block group is non-existent.

In another variant, the method may include receiving uplink data at the network entity from the user equipment or transmitting downlink data from network entity to the user equipment using the one or more of the plurality of resource block groups within the bandwidth part, wherein the one or more of the plurality of resource block groups are indicated in the downlink control information.

In an additional variant, the method may include transmitting an index to the user equipment, wherein the index defines the common frequency resource allocation grid.

In a variant, the index may be the common reference point of the common frequency resource allocation grid.

According to a second embodiment, a method may include receiving downlink control information at a user equipment from a network entity. The downlink control information may include a frequency allocation that accommodates a size of one or more of a plurality of resource block groups in a bandwidth part. The method also includes determining a frequency location of the bandwidth part of the user equipment. The frequency location of the bandwidth part may be offset from a reference point of a common frequency resource allocation grid. In addition, the method may include determining the size of one or more of the plurality of resource block groups within the bandwidth part of the user equipment based on the frequency location of the bandwidth part relative to the reference point of the common frequency resource allocation grid. Further, the method includes transmitting uplink data from the user equipment to the network entity or receiving downlink data at the user equipment from the network entity using the one or more of the plurality of resource block groups having the determined frequency location and the determined size within the bandwidth part.

In a variant, the one or more of the plurality of resource block groups used for the transmitting of the uplink data or the receiving of the downlink data are indicated in the received downlink control information.

In another variant, the method may include offsetting a starting of the frequency location of the bandwidth part of the user equipment by a specific number of resource blocks from the reference point of the common frequency resource allocation grid.

In an additional variant, a length of a frequency resource allocation field of the downlink control information accommodates the size of one or more of the plurality of resource block groups within the bandwidth part of the user equipment.

In a further variant, the method may include receiving an index from the network entity to the user equipment, wherein the index defines the reference point of the common frequency resource allocation grid.

In a variant, the index may be the common reference point of the common frequency resource allocation grid.

In another variant, the method may include receiving the downlink control information via a shared channel at the user equipment.

In another variant, the resource block groups are precoding resource block groups.

In a further variant, wherein the size of the one or more of the plurality of resource block groups within the bandwidth part is either a configured size at the user equipment or a default size.

In a variant, the method may include calculating the size of a left-most resource block group included in the resource block groups in the bandwidth part. The size of the left-most resource block group may be equal to or lower than the configured size or the default size of the one or more of the plurality of resource block groups.

In another variant, the method may include calculating a number of one of more middle resource block groups included in the plurality of resource block groups in the bandwidth part based on the configured size or the default size of the one or more of the plurality of resource block groups.

In an additional variant, the method may include calculating the size of a right-most resource block group included in the resource block groups in the bandwidth part. The size of the right-most resource block group may be equal to or lower than the configured size or the default size of the one or more of the plurality of resource block groups.

In a further variant, the right-most group resource block group is non-existent.

In a variant, a length of a frequency resource allocation field of the downlink control information is calculated to accommodate or to be a same size for at least one of the left-most resource block group, the one or more middle resource block groups, or the right-most resource block group.

According to a third and fourth embodiment, an apparatus can include at least one processor and at least one memory and computer program code. The at least one memory and the computer program code can be configured to, with the at least one processor, cause the apparatus at least to perform a method according to the first embodiment and the second embodiment, and any of its variants.

According a fifth and sixth embodiment, an apparatus can include means for performing the method according to the first embodiment and the second embodiment, and any of its variants.

According to a seventh and an eighth embodiment, a computer program product may encode instructions for performing a process including a method according to the first embodiment and the second embodiment, and any of its variants.

According to a ninth and a tenth embodiment, a non-transitory computer-readable medium may encode instructions that, when executed in hardware, perform a process including a method according to the first embodiment and the second embodiment, and any of its variants.

According to an eleventh and a twelve embodiment, a computer program code may include instructions for performing a method according to the first embodiment and the second embodiment, and any of its variants.

BRIEF DESCRIPTION OF THE DRAWINGS

For proper understanding of the invention, reference should be made to the accompanying drawings, wherein:

FIG. 5 illustrates an example of a system according to certain embodiments.

DETAILED DESCRIPTION

In certain embodiments that employ LTE technology, each UE may independently interpret the precoding resource block group in the context of its individual active BWP frequency location, bandwidth, and configured nominal RBG size. The resource block group of the UE may be interpreted as starting from the left edge of the UE's BWP, each scheduled RBG being a size P, where P is a number of physical resource blocks included in each RBG or PRG, until reaching the right end of the BWP. The right-most RBG may have a smaller size than P, when the BWP size is not an integer multiple of P. The UE, therefore, starts from the left edge of the BWP, determines a whole number of RBGs of size P included within the BWP, and is then left with the right-most resource blocks in the BWP that amount to less than P. The left, middle, and right locations of the resource blocks described herein are locations on a frequency axis.

The number of RBGs may therefore be calculated according to the following equation:

$$N_{RBG} = \left\lceil \frac{N_{BWP}^{size}}{P} \right\rceil.$$

The equation for calculating the $N_{RBG}$ may be a ceiling function, which outputs the smallest or least integer that meets the requirements of the equation. $N_{RBG}$ may refer to the total number of RBGs in a BWP, $N_{BWP}^{size}$ may refer to a downlink carrier BWP size, and P may refer to the size of each individual RBG. If $N_{BWP}^{size}$ mode P is greater than 0, then one of the RBGs in the BWP may have a size represented by the following equation:

$$N_{BWP}^{size} - P \times \left\lfloor \frac{N_{BWP}^{size}}{P} \right\rfloor.$$

In other words, the right-most RBG may have a size less than P, and greater than or equal to one physical resource blocks.

The bitmap, in some embodiments, has a size of $N_{RBG}$ bits with one bitmap bit assigned per RBGs, so that each RBG may be addressable. The RBGs may be indexed in the order of increasing frequency and non-increasing RBG sizes starting at the lowest frequency of the carrier bandwidth part. The order of the RBG bitmap may be such that RBG 0 to RBG $N_{RBG}-1$ may be mapped from most significant bit (MSB) to least significant bit (LSB). The RBG may be allocated to the user equipment when the corresponding bit value in the bitmap is 1. Otherwise, the RBG may be not allocated to the UE.

Figure 1:
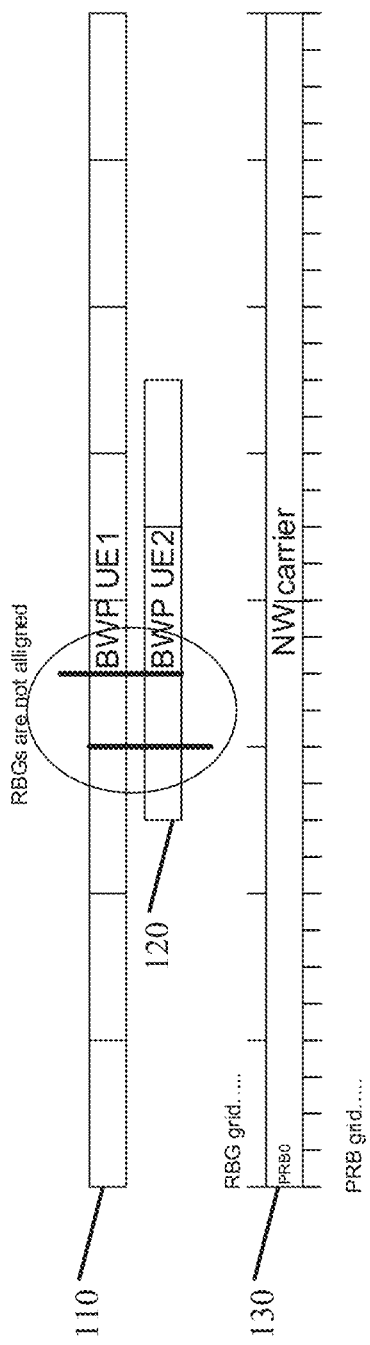
FIG. 1 illustrates an example of BWPs according to certain embodiments.

Different UE RBGs or PRGs may follow user-specific PRB indexing in the BWP, which may make it difficult to align the RBG grid of different BWPs, which use different BWPs of different sizes and starting locations within the network carrier. FIG. 1 illustrates an example of BWPs according to certain embodiments. In particular, FIG. 1 illustrates two different BWPs configured on a network carrier. A first BWP 110 is configured for a first UE, referred to as UE1, while a second BWP 120 is configured for a second UE, referred to as UE2. BWP 110 configured for UE1 spans the full bandwidth of network carrier 130, while the other BWP 120 configured for UE2 only spans part of the bandwidth of the network carrier. As can be seen in FIG. 1, if the RBG grid is UE specific, then the RBG grids of different UEs do not match, which causes significant inefficiency in scheduling. Because each UE uses its own specific RBG grid, it may be difficult for the network entity to allocate uplink and/or downlink resources without experiencing interference, or scarifying the efficiency of resource allocation, between the UEs in the cell.

To solve this problem of misaligned RBG grids in different BWPs, certain embodiments may use a common RBG grid per cell indicated via a common physical resource block index. All of the UEs in a given cell may use the common RBG grid, thereby providing all of the UEs in the cell a common reference point. In other words, all of the UEs use the same common RBG grid, also referred to as a common frequency domain resource allocation grid. Some embodiments help to define the RBGs of a BWP given this common RBG grid. Specifically, certain embodiments may calculate the size of the individual RBGs, as well as the number of RBGs for a given BWP location using the common RBG grid. The common RBG grid may be configured by the network operator. For example, the common RBG grid may have a valid boundary every 16 PRBs, and start at common PRB #0 of the common PRB grid.

In certain embodiments, a UE may be provided with or may receive an index that defines the common frequency resource allocation grid of a cell. The index may be the PRB #$0_{CMN}$. In other words, the UE may be provided with a frequency location of a common reference point of the common frequency resource allocation grid, referred to as a PRB #$0_{CMN}$. For example, the UE may be provided with the index upon entering a given cell. The reference point may therefore be a common PRB that can be used to define an origin reference point of the allocation grid of the cell. The location of the bandwidth part may be determined based on or in reference to the PRB #$0_{CMN}$. The location may be a frequency location of the bandwidth part.

Figure 2:
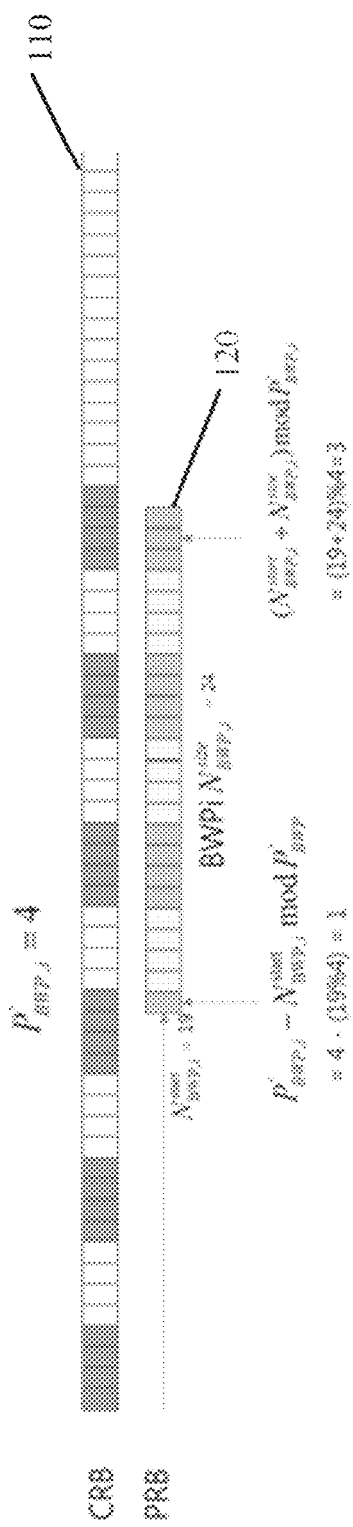
FIG. 2 illustrates an example of BWPs according to certain embodiments.

In some embodiments, a starting frequency location of the bandwidth part, meaning the left edge, left-most, or first PRB of the BWP, may be offset by a UE specific number of PRBs, also referred to as a K, from the reference point of the common frequency resource allocation grid. K may be an integer that is greater than or equal to zero. In certain embodiments below, K may be referred to as $N_{BWP}^{start}$. The starting frequency location of the BWP may be located to the right of the reference point of the common frequency resource allocation grid, as shown in FIG. 2. The BWP may be configured to be an N number of PRBs wide. The width of the PRBs, in certain embodiments, may be configured by the network entity. The UE, in certain embodiments, may be configured with an RBG size of P. In other words, the UE may receive a transmission from a network entity indicating the RBG size P. In yet another embodiment, the UE may be preconfigured with a default value of RBG size P.

The common frequency resource allocation grid, which may be referred to as an RBG grid allocation, may be normalized relative to PRB #$0_{CMN}$, rather than to the left edge of the left-most PRB of the BWP. In other words, the origin reference point of the common resource allocation gird will be PRB #$0_{CMN}$ for all UEs in a cell, instead of each individual UE having a UE specific resource grid starting at the first PRB of its BWP. The network entity and/or the UE may calculate the size of a left-most RBG in the bandwidth part. In certain embodiments, both the network entity and the user equipment may determine or calculate the size and/or frequency location of the RBGs in the BWP. The size of the left-most RBG may be equal to or lower than the configured size or the default size of the one or more of the plurality of RBGs.

The left-most RBG of the BWP may be referred to as RBG #0. The size of the left-most RBG may be calculated by the following equation: $RBG_0^{size} = P - N_{BWP}^{start} \mod P$, where $N_{BWP}^{start}$ is the frequency offset defining the start of the BWP relative to PRB #$0_{CMN}$ in PRBs, P is the default or configured RBG size, while mod is a modulo function. The frequency location of the first PRB of the left-most RBG may be located at PRB $N_{BWP}^{start}$ relative to the PRB #$0_{CMN}$. The first PRB may be offset by a UE specific number of PRBs from PRB #$0_{CMN}$. The offset, in some embodiments, may be transmitted to the UE.

In certain embodiments, the size and frequency location of the middle RBGs of the BWP may be calculated. The middle RBGs may be located between the left-most RBG and the right-most RBG on a frequency axis. The size of the one or more middle RBGs in the BWP may be a default size P or a size P configured at the UE by the network entity. The number of middle RBGs may be calculated according to the following equation: $N_{RBG}^{middle} = \lfloor (N_{BWP}^{size} - RBG_0^{size})/P \rfloor$. The equation for calculating the number of middle RBGs may be a floor function, which outputs the greatest integer that meets the requirements of the equation. In other words, a number of one of more middle RBG included in the plurality of RBGs may be calculated in the BWP based on the configured size or the default size of the one or more of the plurality of RBGs. The left-most PRB frequency location of a RBG # i relative to PRB #$0_{CMN}$ may be given by the following equation: $N_{BWP}^{start} + RBG_0^{size} + P \times (i-1)$, which i is any one of a middle RBGs. In other words, the left-most PRB frequency location of a RBG # i may be determined based on PRB #$0_{CMN}$, the size of the left-most RBG, and size P of the one or more middle RBGs.

The size of the right-most RBG of a BWP may be calculated according to the following equation: $RBG_{last}^{size} = N_{BWP}^{size} - RBG_0^{size} - P \times N_{RBG}^{middle}$. The UE and/or network entity may therefore calculate the size of a right-most RBG in the BWP included in the RBG. The size of the right-most resource block group may be equal to or lower than the configured size or the default size of the one or more of the plurality of RBGs. The left-most PRB frequency location of the right-most or last RBG, relative to PRB #$0_{CMN}$, may be determined by the following equation: $N_{BWP}^{start} - RBG_0^{size} + P \times N_{RBG}^{middle}$. The starting frequency location of the right-most RBG is therefore based on PRB #$0_{CMN}$, the size of the left-most RBG, and the size P and number of the one or more middle RBGs. If the size of the last RBG is zero, the right-most RBG may be considered non-existing. In other words, if the number of remaining RBGs in the BWP after the left-most RBG is equal to P, or a multiple of P, the right-most RBG may not be calculated, since a middle RBG will occupy the right-most position on the BWP.

A length of the frequency resource allocation field of the DCI may be calculated to accommodate or to be a same size for at least one of the left-most resource block group, the one or more middle resource block groups, and/or the right-most resource block group. The number of RBGs may be represented by the following equation: $N_{RBG} = N_{RBG}^{middle} + 2$, when the size of the right-most RBG is in existence. Otherwise, the number of RBGs in the BWP may be represented as follows $N_{RBG} = N_{RBG}^{middle} + 1$. The number of bits needed to address all of the resources of the BWP, for example, may be $N_{RBG}$. In other words, the length or size of the frequency resource allocation field of the DCI may be represented by $N_{RBG}$. In certain other embodiments, the length of the frequency resource allocation field may be either larger or smaller than $N_{RBG}$.

The above embodiments may be used to determine the size and/or frequency location of both uplink and/or downlink RBGs of different BWPs associated with different UEs in a single cell. Determining the size and frequency location of the RBGs on the BWP may help to ensure that the RBG size of all UEs on different BWPs are nested, which ensures efficient UE multiplexing on the network carrier. In other words, even when the BWPs of different UEs partially overlap or fully overlap, different BWPs can become nested or aligned by calculating the left-most and right-most RBG in the BWP, and then standardizing the size of the middle RBGs in the cell. This may help to prevent interference among the different UEs in a cell, while also improving the overall communication efficiency of the cell.

In certain embodiments, the common precoding resource block group (PRG) grid used to determine the resource blocks, for which the precoder is assumed to be constant, may operate the same way as the RBG common grid. However, in some embodiments the PRG and the RBG may be configured independently. The size and frequency location of the left-most PRG in a given BWP, as also referred to as PRG #0, may be calculated. The size of PRG #0 may be calculated according to the following equation: $P'_{BWP} - N_{BWP}^{start} \bmod P'_{BWP}$, where $N_{BWP}^{start}$ is the frequency offset defining the start of the BWP relative to PRB #$0_{CMN}$ in PRBs, $P'_{BWP}$ is the configured PRG for BWP, and mod is a modulo function. The frequency location of the left-most or first PRG may be located at PRB $N_{BWP}^{start}$ relative to PRB #$0_{CMN}$. The calculation of the left-most PRG may be similar to the calculation of the left-most RBG.

Once the left-most or first PRG in the BWP is calculated, the size and frequency location of the middle PRGs may be calculated. The middle RBGs may have a size of $P'_{BWP}$. The number of the middle PRGs may be calculated in accordance with the following equation using a floor function: $N_{PRG}^{middle} = \lfloor (N_{BWP}^{size} - PRG_0^{size})/P'_{BWP} \rfloor$. The left-most PRB frequency location of a PRG # i relative to PRB #$0_{CMN}$ may be represented by the following equation: $N_{BWP}^{start} + PRG_0 + P'_{BWP} \times (i-1)$, where i represents any one of the middle PRGs.

Once the left-most and the middle PRGs have been calculated, the UE or network entity may determine whether there is a right-most PRG. If the size of the PRG is zero, then the right-most PRG is considered non-existing. The size of the last PRG in the BWP may be calculated in accordance with the following equation: $RBG_{last}^{size} = N_{BWP}^{size} - PRG_0^{size} - P \times N_{RBG}^{middle}$ or $(N_{BWP}^{start} + N_{BWP}^{size}) \bmod P'_{BWP}$. The left-most PRB frequency location of the last or right-most PRG relative to PRB #$0_{CMN}$ may be represented by the following equation: $N_{BWP}^{start} - PRG_0^{size} + P'_{BWP} \times N_{RBG}^{middle}$.

FIG. 2 illustrates an example of BWPs according to certain embodiments. In particular, FIG. 2 illustrates a carrier resource block 110 and BWP 120. As can be seen in FIG. 2, the configured or default size P' of the PRG is 4, while the first PRB of the left-most PRG in the BWP may be offset by 19 PRBs. In other words, $N_{BWP}^{size} = 19$, while $P'_{BWP} = 4$. The size of the first PRG or the left-most PRG in the BWP may be calculated according to the following equation: $P'_{BWP} - N_{BWP}^{start} \bmod P'_{BWP}$. Using the example shown in FIG. 2, the first PRB or the left-most PRG may therefore be 4−(19 mod 4), which equals 1. The number of middle PRGs may equal 5, each having a size of 4 PRBs. The right-most PRG may be calculated according to the following equation: $(N_{BWP}^{start} + N_{BWP}^{size}) \bmod P'_{BWP}$. In FIG. 2, therefore the right-most PRG may have the following number of PRBs, (19+24) mod 4, equaling 3 PRBs.

By determining the size and frequency location of the first, middle, and last PRGs or RBGs. The network entity may be able to allocate resources most efficiently, without the network experiencing interference from multiple UEs in a cell. In other words, by aligning the middle RBGs in the BWP to the RBGs on the network carrier, uplink and/or downlink transmission can be better scheduled by the network, while avoiding any unnecessary interference by two or more UEs in a cell, or improving the efficiency of the multiplexing of different UEs operating on different BWP or with different RBG or PRG sizes. Nesting the BWPs of the UEs may also help to maximize the amount of PRBs of the available bandwidth used for uplink and/or downlink transmissions.

Figure 3:
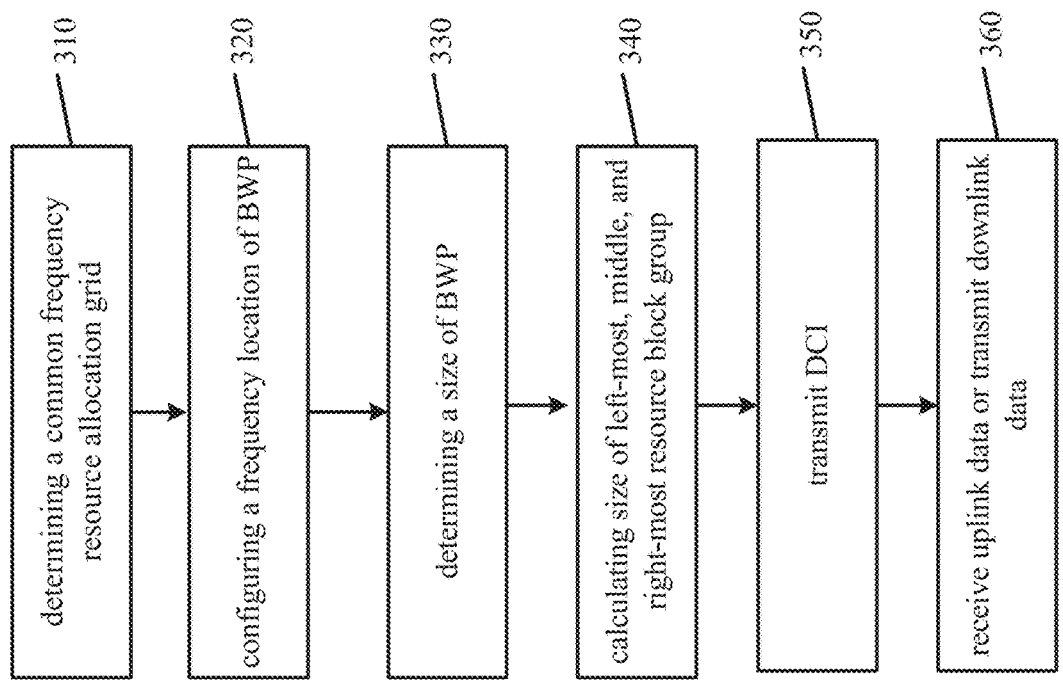
FIG. 3 illustrates an example of a flow diagram according to certain embodiments.

FIG. 3 illustrates an example of a flow diagram according to certain embodiments. In particular, FIG. 3 illustrates a method performed by a network entity, such as enhanced NodeB (eNB) or gNB. In step 310, the network entity may determine a common frequency resource allocation grid for a cell. The network entity may transmit an index to the UE, where the index defines a reference point of the common frequency resource allocation grid, which may be referred to as PRB #$0_{CMN}$. In certain embodiments, PRB #$0_{CMN}$ may be configured by higher layer signaling, and the grid may be determined in the specification given the PRB #$0_{CMN}$.

In step 320, the network entity may configure a frequency location of a BWP of a UE within the cell. The frequency location of the BWP may be offset by $N_{BWP}^{start}$ from a reference point of the common frequency resource allocation grid, also referred to as PRB #$0_{CMN}$. The offset may determine the start of the BWP, while a size of the offset may determine a continuous number of PRBs from the reference point at which the BWP starts, referred to as $N_{BWP}^{start}$. For example, as shown in FIG. 2 the frequency location of the BWP may be offset by an $N_{BWP}^{start}$=19 PRBs. In another example, $N_{BWP}^{size}$=24. The BWP may therefore be offset to a starting frequency location of the BWP by a specific number of PRBs from the reference point of the common frequency resource allocation grid.

In step 330, the network entity may determine a size of one or more of a plurality of RBGs within the BWP of the UE based on the frequency location of the bandwidth part and the reference point of the common frequency resource allocation grid. For example, the network entity may determine the start $N_{BWP}^{start}$ and the size $N_{BWP}^{size}$ of the BWP. The size of the one or more of the plurality of RBGs within the BWP may either be a configured size at the UE or a default size. In some embodiments, the network entity may calculate the size and frequency location of at least one of the left-most RBG, the one or more middle RBGs, or the right-most RBG, as shown in step 340.

The network entity, in certain embodiments, may calculate the size of a left-most RBG included in the RBGs of the BWP. The size of the left-most RBG may be equal to or lower than the configured size or the default size of the one or more of the plurality of RBGs. The network entity may also calculate a number of one of more middle RBGs included in the plurality of RBGs in the BWP based on the configured size or the default size of the one or more of the plurality of RBGs. In some embodiments, the right-most RBG may also be calculated. The size of the right-most RBG may be equal to or lower than the configured size or the default size of the one or more of the plurality of RBGs. In certain embodiments, the right most RBG in the BWP can be non-existent or have a size of zero.

As shown in step 350, the network entity may transmit DCI to the user equipment. The DCI may include a frequency resource allocation field that accommodates the size of the one or more of the plurality of resource block groups. A length of the frequency resource allocation field of the DCI may therefore be calculated to accommodate the sizes of at least one of the left-most RBG, the one or more middle RBGs, and/or the right-most RBG in the BWP. The length of the bitmap in the DCI, for example, may depend on the existence of the right-most RBG or whether the right-most RGB has a size of zero. For example, the number of RBGs may be represented by the following equation: $N_{RBG}=N_{RBG}^{middle}+2$, when the size of the right most RBG is in existence. Otherwise, the number of RBGs in the BWP may be represented as follows: $N_{RBG}=N_{RBG}^{middle}+1$. In other words, the length or size of the frequency resource allocation field of the DCI may be represented by $N_{RBG}$.

The DCI, in certain embodiments, may be transmitted on a shared channel used by the user equipment and one or more other user equipment in a cell. As such, the resource allocation may be received and coordinated between all of the UEs in a cell using the DCI. The RBGs described above may be precoding resource block groups. In step 360, the network entity may then receive uplink data or transmit downlink data based on the scheduling DCI transmitted to the UE. The uplink data may be received via the PUSCH, while the downlink data may be transmitted via the PDSCH. The embodiments described in FIG. 3 may allow for coordinating uplink transmissions of the UE on the one or more of the plurality of RBGs in the cell, and uplink transmissions of another UE on the one or more of the plurality of RBGs in the cell based on the calculated or determined sizes and/or locations of the RBGs.

Figure 4:
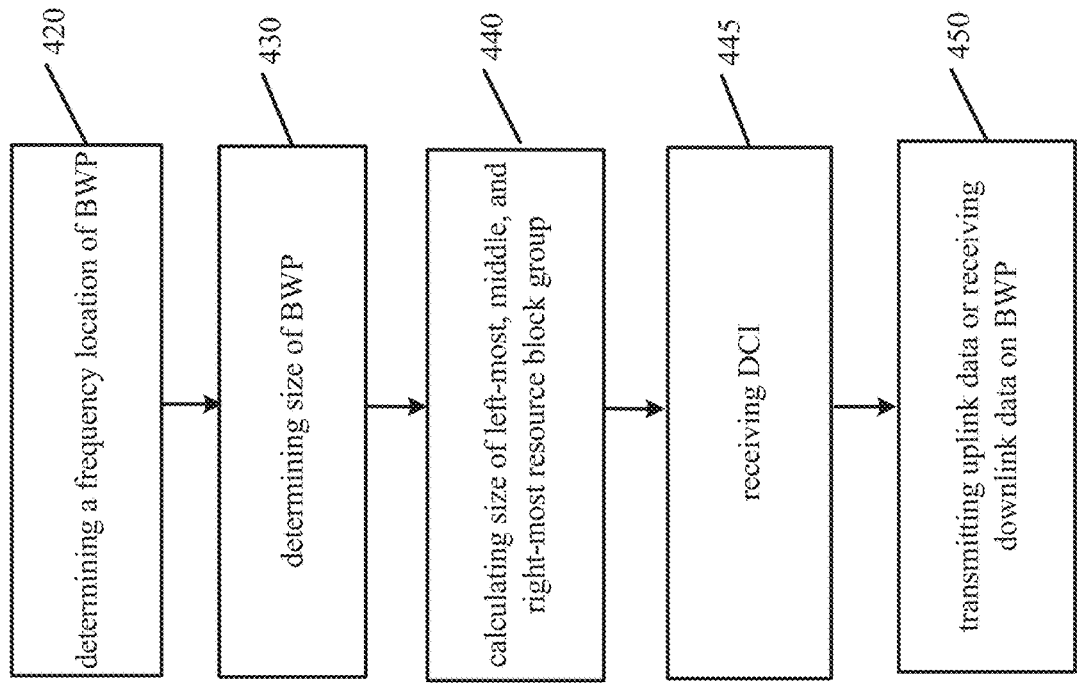
FIG. 4 illustrates an example of a flow diagram according to certain embodiments.

FIG. 4 illustrates an example of a flow diagram according to certain embodiments. In particular, FIG. 4 illustrates a method performed by a UE. The UE shown in FIG. 4 may communicate with the network entity shown in FIG. 3.

In step 420, the UE may determine a frequency location of the BWP of the UE. The frequency location of the BWP may be offset, for example by $N_{BWP}^{start}$, from a reference point of a common frequency resource allocation grid. The offset may determine the start of the BWP, while a size of the offset may determine a continuous number of PRBs from the reference point at which the BWP starts.

In step 430, the UE may then determine the size of one or more of the plurality of RBGs within the BWP of the UE based on the frequency location of the BWP. For example, the network entity may determine the start $N_{BWP}^{start}$ and the size $N_{BWP}^{size}$ of the BWP. The size of the one or more of the plurality of RBGs within the BWP may either be a configured size at the UE or a default size. In step 440, the UE may calculate the size of at least one of the left-most RBG, the one or more middle RBGs, and/or the right-most RBG. In certain embodiments, the right most RBG in the BWP can be non-existent or have a size of zero. Specifically, the UE may calculate the size of a left-most RBG in the BWP. The size of the left-most RBG may be equal to or lower than the configured size or the default size of the one or more of the plurality of RBGs.

The UE may also calculate a number of one of more middle RBGs included in the plurality of RBGs in the BWP based on the configured size or the default size of the one or more of the plurality of RBGs. In certain embodiments, the UE may then calculate the size of the right-most RBG in the BWP included in the RBGs. The size of the right-most RBG may be equal to or lower than the configured size or the default size of the one or more of the plurality of RBGs. In some embodiments, the RBGs may be precoding resource block groups.

In step 4445, the UE may receive DCI from a network entity. The DCI may include a frequency allocation that accommodates a size of one or more of a plurality of RBGs in a BWP of the UE. In other words, the length of the field size of the DCI may accommodate or be a same size for at least one of the left-most RBG, the one or more middle RBGs, and the right-most RBG. In certain embodiments, the right most RBG in the BWP can be non-existent or have a size of zero. The DCI may be received via a shared channel at the UE. The UE, in certain embodiments, may receive an index from the network entity, where the index defines a reference point of the common frequency resource allocation grid, which may be referred to as PRB #$0_{CMN}$.

In step 450, the UE may transmit uplink data to the network entity or receive downlink data from network entity using the one or more of the plurality of RBGs having the determined frequency location and the determined size within the BWP. The uplink data may be transmitted via the PUSCH, while the downlink data may be received via the PDSCH. The one or more of the plurality of RBGs used for the transmitting of the uplink data or the receiving of the downlink data are indicated in the received DCI.

FIG. 5 illustrates a system according to certain embodiments. It should be understood that each signal or block in FIGS. 1-4 may be implemented by various means or their combinations, such as hardware, software, firmware, one or more processors and/or circuitry. In one embodiment, a system may include several devices, such as, for example, network entity 520 or UE 510. The system may include more than one UE 510 and more than one network entity 520. Network entity 520, may be a network node, a base station, an access point, an access node, an eNB, a gNB, a server, a host, or any other network core entity that may communicate with the UE.

Each of these devices may include at least one processor or control unit or module, respectively indicated as 511 and 521. At least one memory may be transmitted in each device, and indicated as 512 and 522, respectively. The memory may include computer program instructions or computer code contained therein. One or more transceiver 513 and 523 may be transmitted, and each device may also include an antenna, respectively illustrated as 514 and 524. Although only one antenna each is shown, many antennas and multiple antenna elements may be transmitted to each of the devices. Other configurations of these devices, for example, may be transmitted. For example, network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network entity deliver local content. One or more functionalities may also be implemented as virtual application(s) in software that can run on a server.

A user device or a UE 510, may be a mobile station (MS) such as a mobile phone or smart phone or multimedia device, a computer, such as a tablet, transmitted with wireless communication capabilities, personal data or digital assistant (PDA) transmitted with wireless communication capabilities, portable media player, digital camera, pocket video camera, navigation unit transmitted with wireless communication capabilities or any combinations thereof. In other embodiments, the UE may be a machine type communication (MTC) device, an eMTC UE, or an Internet of Things device, which may not require human interaction, such as a sensor, a meter, or an actuator.

In some embodiments, an apparatus, such as a user equipment or a network entity, may include means for carrying out embodiments described above in relation to FIGS. 1-4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 520 or UE 510, to perform any of the processes described above (see, for example, FIGS. 1-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 4 illustrates a system including a network entity 520 and UE 510, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 510 may likewise be provided with a variety of configurations for communication other than communication network entity 520. For example, the UE 510 may be configured for device-to-device, machine-to-machine, and/or vehicle-to-vehicle transmission.

The above embodiments may provide for significant improvements to the functioning of a network, the functioning of the network entities within the network, and/or the user equipment communicating with the network. For example, the above embodiments may allow for the nesting or aligning of UE specific BWPs having different RBGs sizes and locations in a cell. The nesting or aligning of the RBGs in the different BWPs may allow for more efficient multiplexing on the network carrier. In other words, certain embodiments may prevent interfering transmissions from being sent and/or received at different UEs because of varying BWPs sizes and locations. Some embodiments may therefore allow for the aligning of RBGs to a common reference grid, regardless of the size or frequency location of the BWP being used by the UE. This increases the efficiency of the network, improves network scheduling, and reduces the amount of resources wasted by the network due to scheduled interference.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to NR or 5G technology, certain other embodiments may be applied to other 3GPP technology, or any other standard setting body, such as Long Term Evolution (LTE), LTE-Advanced technology, Internet-of-Things (IoT) technology, fourth generation (4G) technology, and/or third generation (3G) technology.

| Partial Glossary: | |
|---|---|
| BWP | (carrier) bandwidth part |
| gNB | 5G or NR NodeB |
| DCI | Downlink Control Information |
| CRB | Carrier Resource Block |
| DL | Downlink |
| NR | New Radio |
| PRB | Physical Resource Block |
| PRG | Precoding Resource Block Group |
| RBG | Resource Block Group |
| UE | User Equipment |

We claim:

1. An apparatus, comprising:
   at least one processor; and
   at least one memory comprising computer program code,
   the at least one memory and computer program code configured, with the at least one processor, to cause the apparatus at least to
   determine a common frequency resource allocation grid in a cell;
   configure a frequency location of a bandwidth part of a user equipment within the cell, wherein the frequency location of the bandwidth part is offset from a reference point of the common frequency resource allocation grid;
   determine a size of one or more of a plurality of resource block groups within the bandwidth part of the user equipment based on the frequency location of the bandwidth part relative to the reference point of the common frequency resource allocation grid;
   transmit downlink control information to the user equipment, wherein the downlink control information comprises a frequency allocation that accommodates the size of the one or more of the plurality of resource block groups; and
   calculate a size of a right-most resource block group in the bandwidth part included in the resource block groups, wherein the size of the right-most resource block group is equal to or lower than the configured size or the default size of the one or more of the plurality of resource block groups.

2. The apparatus according to claim 1, wherein a starting of the frequency location of the bandwidth part of the user equipment is offset by a specific number of resource blocks from the reference point of the common frequency resource allocation grid.

3. The apparatus according to claim 1, wherein the resource block groups are precoding resource block groups.

4. The apparatus according to claim 1, wherein the size of the one or more of the plurality of resource block groups within the bandwidth part is one of a configured size or a default size.

5. The apparatus according to claim 1, wherein the at least one memory and computer program code are further configured, with the at least one processor, to cause the apparatus at least to coordinate uplink transmissions of the user equipment on the one or more of the plurality of resource block groups in the cell and the uplink transmissions of another user equipment on the one or more of the plurality of resource block groups in the cell based on the determined size or frequency location of the one or more of the plurality of the resource block groups.

6. The apparatus according to claim 1, wherein the at least one memory and computer program code are further configured, with the at least one processor, to cause the apparatus at least to:
   calculate a size of a left-most resource block group in the bandwidth part included in the resource block groups, wherein the size of the left-most resource block group is equal to or lower than the configured size or the default size of the one or more of the plurality of resource block groups.

7. The apparatus according to claim 1, wherein a length of a frequency resource allocation field of the downlink control information is calculated to accommodate or to be a same size for at least one of a left-most resource block group, one or more middle resource block groups, or a right-most resource block group.

8. The apparatus according to claim 1, wherein the at least one memory and computer program code are further configured, with the at least one processor, to cause the apparatus at least to receive uplink data from the user equipment or transmit downlink data to the user equipment using the one or more of the plurality of resource block groups within the bandwidth part, wherein the one or more of the plurality of resource block groups are indicated in the downlink control information.

9. The apparatus according to claim 1, wherein the at least one memory and computer program code are further configured, with the at least one processor, to cause the apparatus at least to transmit an index to the user equipment, wherein the index defines the common frequency resource allocation grid.

10. The apparatus according to claim 1, wherein the index is the common reference point of the common frequency resource allocation grid.

11. An apparatus, comprising:
at least one processor; and
at least one memory comprising computer program code,
the at least one memory and computer program code configured, with the at least one processor, to cause the apparatus at least to
determine a frequency location of a bandwidth part configured for the apparatus, wherein the frequency location of the bandwidth part is offset from a reference point of a common frequency resource allocation grid;
wherein a size of one or more of a plurality of resource block groups within the bandwidth part configured for the apparatus is based on the frequency location of the bandwidth part relative to the reference point of the common frequency resource allocation grid;
receive downlink control information from a network entity, wherein the downlink control information comprises a frequency allocation that accommodates the size of said one or more of the plurality of the resource block groups in the bandwidth part;
transmit uplink data to the network entity or receive downlink data from the network entity using the one or more of the plurality of resource block groups having the frequency location and the size within the bandwidth part; and
calculate a size of a right-most resource block group included in the resource block groups in the bandwidth part, wherein the size of the right-most resource block group is equal to or lower than the configured size or the default size of the one or more of the plurality of resource block groups.

12. The apparatus according to claim 11, wherein the one or more of the plurality of resource block groups used for the transmitting of the uplink data or the receiving of the downlink data are indicated in the received downlink control information.

13. The apparatus according to claim 11, wherein the at least one memory and computer program code are further configured, with the at least one processor, to cause the apparatus at least to offset a starting of the frequency location of the bandwidth part configured for the apparatus by a specific number of resource blocks from the reference point of the common frequency resource allocation grid.

14. The apparatus according to claim 11, wherein a length of a frequency resource allocation field of the downlink control information accommodates the size of one or more of the plurality of resource block groups within the bandwidth part of the apparatus.

15. The apparatus according to claim 11, wherein the at least one memory and computer program code are further configured, with the at least one processor, to cause the apparatus at least to receive an index from the network entity, wherein the index defines the reference point of the common frequency resource allocation grid.

16. The apparatus according to claim 15, wherein the index comprises the common reference point of the common frequency resource allocation grid.

17. The apparatus according to claim 11, wherein the resource block groups are precoding resource block groups.

18. The apparatus according to claim 11, wherein the size of the one or more of the plurality of resource block groups within the bandwidth part is one of a configured size at the apparatus or a default size.

19. The apparatus according to claim 11, wherein the at least one memory and computer program code are further configured, with the at least one processor, to cause the apparatus at least to:
calculate the size of a left-most resource block group included in the resource block groups in the bandwidth part, wherein the size of the left-most resource block group is equal to or lower than the configured size or the default size of the one or more of the plurality of resource block groups; and
calculate a number of one of more middle resource block groups included in the plurality of resource block groups in the bandwidth part based on the configured size or the default size of the one or more of the plurality of resource block groups.

20. The apparatus according to claim 11, wherein a length of a frequency resource allocation field of the downlink control information is calculated to accommodate or to be a same size for at least one of the left-most resource block group, the one or more middle resource block groups, or the right-most resource block group.

* * * * *